(12) United States Patent
Mohamed et al.

(10) Patent No.: US 8,043,426 B2
(45) Date of Patent: Oct. 25, 2011

(54) METHOD FOR TREATING CEMENT KILN DUST

(76) Inventors: Abdel-Mohsen Onsy Mohamed, Abu Dhabi (AE); Maisa Mabrouk El-Gamal, Abu Dhabi (AE)

( * ) Notice: Subject to any disclaimer, the term of this patent is extended or adjusted under 35 U.S.C. 154(b) by 489 days.

(21) Appl. No.: 12/119,525

(22) Filed: May 13, 2008

(65) Prior Publication Data
US 2009/0283016 A1    Nov. 19, 2009

(51) Int. Cl.
*C04B 14/28* (2006.01)
(52) U.S. Cl. .................................................. 106/716
(58) Field of Classification Search ............ 106/716
See application file for complete search history.

(56) References Cited

U.S. PATENT DOCUMENTS

| | | | | |
|---|---|---|---|---|
| 4,402,891 A | * | 9/1983 | Kachinski, Jr. | 264/40.1 |
| 4,584,179 A | * | 4/1986 | Galli | 422/187 |
| 5,792,440 A | * | 8/1998 | Huege | 423/432 |
| 6,613,141 B2 | * | 9/2003 | Key, Jr. | 106/751 |
| 7,141,093 B2 | * | 11/2006 | Charette | 95/107 |

FOREIGN PATENT DOCUMENTS

JP    200527930 A  * 10/2005

OTHER PUBLICATIONS

JP 200527930 A (Oct. 13, 2005) Yamada et al. Machine Translation into English.*

* cited by examiner

*Primary Examiner* — Paul Marcantoni
(74) *Attorney, Agent, or Firm* — Lowe Hauptman Ham & Berner, LLP

(57) ABSTRACT

A method for treating cement kiln dust containing alkaline metal salts includes the steps of hydration (formation of calcium hydroxide), dehydration i.e. drying, fractionation by sieving and carbonation (reaction of the fractionated moistened cement kiln dust) with $CO_2$ gas in a fluidized bed reactor.

20 Claims, 8 Drawing Sheets

METHOD FOR TREATING CEMENT KILN DUST

FIELD OF THE INVENTION

This invention relates to a method for treating cement kiln dust and more particularly to a process for converting cement kiln dust into a stable material.

BACKGROUND FOR THE INVENTION

Cement kiln dust is a by-product of the cement manufacturing process that is removed from the stream of kiln gases as they pass through the kiln's dust collection system during clinker production. Cement kiln dust can vary in composition from virtually unaltered kiln feed to over 90% alkali sulfates and chlorides depending on process type, kiln configuration, raw materials, fuels, process characteristics, and points of collection. It can vary in particle size from that of fine sand or silt to that of clay, with particle size distribution ranging from very broad to very narrow depending on material and process parameters. The quantities of dust generated from a particular kiln depends on the factors that control cement kiln dust composition as well as the internal configuration of the kiln, the quantities of gasses passed through the kiln, and other operating conditions.

Cement kiln dust is a major problem at many cement manufacturing plants. Dust is generated in large quantities and is often not suitable for direct return to the cement-producing process as a feed because of high concentrations of alkali metals and sulfates, and incompatibility of the dust with the process. Since large quantities of dust cannot be returned directly to the kiln, it must be disposed of in a safe manner. General disposal practices are placement of dust in waste piles or in land-or quarry fills. Such disposal methods are inherently unsatisfactorily because they involve wasting a material for which significant processing and handling costs and efforts have been incurred. Since environmental regulations have matured, the costs and problems of disposal have become more onerous and continued disposal of kiln dust has become more expensive.

When cement kiln dust is brought into contact with water, high concentrations of anhydrous phases, which include oxides, sulfates and chlorides, are soluble and leached. Since the prime source of cement kiln dust instability is the high contribution of alkali metals oxides, and sulfates, which have high affinity towards water, the question is how to convert the undesired oxides into stable materials like carbonates, to decrease the solubility, and consequently increase the durability of the application, through effective and inexpensive processes.

Treated cement kiln dust has the potential for use in engineering projects such as soil stabilization, waste stabilization/solidification, Portland cement replacement, asphalt pavement, controlled low strength material (flowable fill), Pozzolanic activator, lightweight aggregate, and construction fill, but this isn't always possible.

Problems relating to cement kiln dust have long been recognized, and various methods have been proposed for their solution. The following methods have been suggested for treating cement kiln dust. The methods include leaching the dust with water to remove alkalis:

Nestell, in a U.S. Pat. No. 1,307,920 mixed kiln dust with water and passed carbon dioxide into the resulting mixture to substantially neutralize the slurry. However the product could not be recycled back into the cement kiln for its use as a kiln feed material unless the alkali levels of the original dust were very low.

Palonen et al., in U.S. Pat. No. 2,871,133 agglomerated cement kiln dust at high pressure and temperature, to render the alkalis more soluble. The resulting heat-treated agglomerate was then leached with water to remove the soluble alkalis. The residual solids are further treated to adjust moisture for return to a cement kiln. This process suffers because it is very complicated.

Patzias, in U.S. Pat. No. 2,991,154 mixed kiln dust with water and then heated at a known pressure. The slurry was filtered to separate the solution containing the alkalis from the residual solids. Then the separated solution was treated by neutralization with sulfuric acid, evaporation, centrifugation, or a combination thereof, to recover alkali sulfates, for recycling to the cement-making process. This process is not practical because of high water to dust ratio, high temperature, and high pressure to affect the dissolution of alkalis. Kiln dust solids would differ significantly in composition from normal kiln feed requiring kiln feed correction.

McCord, in U.S. Pat. No. 4,031,184 leached cement kiln dust at high temperature (but not at high pressure) using potassium chloride to enhance solubility. Then, the cement kiln dust solids are flocculated using oil and a fatty acid and the precipitates are palletized. Since the solubility of potassium chloride is higher than that of potassium sulfate by more than a factor of two in both hot and cold water, it is much more likely that any precipitate will be potassium sulfate rather than potassium chloride.

Helser, et al, in U.S. Pat. No. 4,219,515 added carbon dioxide to wastewater from the production of hydrous calcium silicates from lime and silica in order to remove calcium from the water so that it can be recycled to the production process. The resulting calcium carbonate precipitate presumably can be re-producing lime.

Kachinski, in U.S. Pat. No. 4,402,891 added water to cement kiln dust in a carbon dioxide atmosphere. Alkalies are not completely removed, and the material is not suitable for return to a cement-making process.

Neilsen, in U.S. Pat. No. 5,173,044 used wet-process slurry to scrub sulfur from kiln gases and retain them in the kiln. This process is of limited applicability because it retains all of the alkalies in the kiln so that, in the majority of cases, only limited amounts of cement kiln dust can be used.

Brentrup, in U.S. Pat. No. 5,264,013 collected cement kiln dust in a conventional dust collector, which was later progressively heat-treated to volatilize low-boiling pollutants and collect them with a carbonaceous filter medium. The ability to return cement kiln dust to the cement-making process was not enhanced.

Huege, in U.S. Pat. No. 5,792,440 used carbon dioxide to treat a supernatant liquid after leaching and separation of the solids from lime kiln dust in order to produce high purity precipitated calcium carbonate as a separate product, for treating flue gases exhausted from a lime kiln. This method is only useful as an effluent control.

Gebhardt, in U.S. Pat. No. 6,331,207 moistened the supply of cement kiln dust with carbon dioxide to convert the materials to carbonates. During the carbonation cycle, the water in the hydroxides is released to formulate slurry. The soluble alkalis and sulfate are released in the liquid phase with the solids being separated from the liquid. Then, the solids were washed to provide a useful feed to the kiln while, the liquid contains alkali salts.

Prior methods that have been used in the past frequently suffer from the following problems:

1. Only part of the alkalis are readily soluble, often half or less.
2. Typical ratios of water to dust are 10:1 to 20:1, or higher.
3. An effluent, high in pH (>10) and dissolved solids, are discharged.
4. Dissolved solids tend to precipitate in the receiving waters.
5. The high pH effluent is detrimental to the biosphere.
6. The recovered solids are high in water content, often over 70%.
7. Adjustments to kiln feed chemistry may be required when treated dust is returned to the kiln.

These problems are so severe that the leaching methods of the past have been largely banned by Environmental Protection bodies.

The present invention provides a new technique for producing treated cement kiln dust through reduction of alkali metals and sulfates solubility's by conditioning the dust so that it is compatible with the process to which it will be introduced. The highly alkaline waste kiln dust found in the forms of oxides and hydroxide of calcium, potassium and sodium is converted to mildly alkaline calcium carbonate, and potassium and sodium bicarbonates.

BRIEF SUMMARY OF THE INVENTION

It is an object of the present invention to encapsulate the heavy metals in a treated formulate, not only to lessen the dissolution of the leaching, but also to reach stabilization. The treatment of this invention is fixation through precipitation and it addresses the use of $CO_2$ as a stabilizing agent. However; stabilization or chemical fixation may be achieved by using combinations of $CO_2$ and a hydrated form of cement kiln dust. $CO_2$ used alone or in combination with water promotes stabilization of many inorganic constituents in cement kiln dust through a variety of mechanisms. These mechanisms include precipitation as carbonates, and so forth; microencapsulating of the waste particles through pozzolanic reactions; formation of metal precipitates, and also utilize $CO_2$ gas that would otherwise be emitted to the atmosphere.

It is another objective of the invention to transform hazardous wastes to nontoxic waste and/or reduce the release of toxic materials into the environment. It is a further objective of the invention to provide a highly effective and inexpensive method for reducing or moderating the high alkalinity of cement kiln dust. It is a still further objective of the invention to provide a process that does not generate a liquid effluent discharge.

In essence the present invention contemplates a method for treating waste cement kiln dust containing alkaline earth metal salts for reducing or moderating the high alkalinity of the kiln dust by converting the oxides and hydroxides of calcium, potassium and sodium to mildly alkaline calcium carbonate and potassium and sodium bicarbonates.

The method includes the step of providing a mass of cement kiln dust and an amount of water wherein the kiln dust contains alkaline earth metal salts and wherein the cement kiln dust/water weight ratio is preferably about 2 to about 1.1. The water temperature is preferably between 35° to about 45° C. and the mixing is preferably done at about 600 rpm for about 30 minutes. The mixture of cement kiln dust and water is then dried preferably at a temperature of 80° C. or less for a period of about 24 hours. The dried mixture is then fractionated as for example by passing through a sieve with 1/16$^{th}$ inch openings. The method also incorporates a fluidized bed reactor to carbonate the moist fractionated cement kiln dust, using pressurized $CO_2$.

The invention will now be described in connection with the following drawings wherein like reference numerals have been used to identify like parts.

DESCRIPTION OF THE PREFERRED EMBODIMENTS OF THE INVENTION

Figure 1:
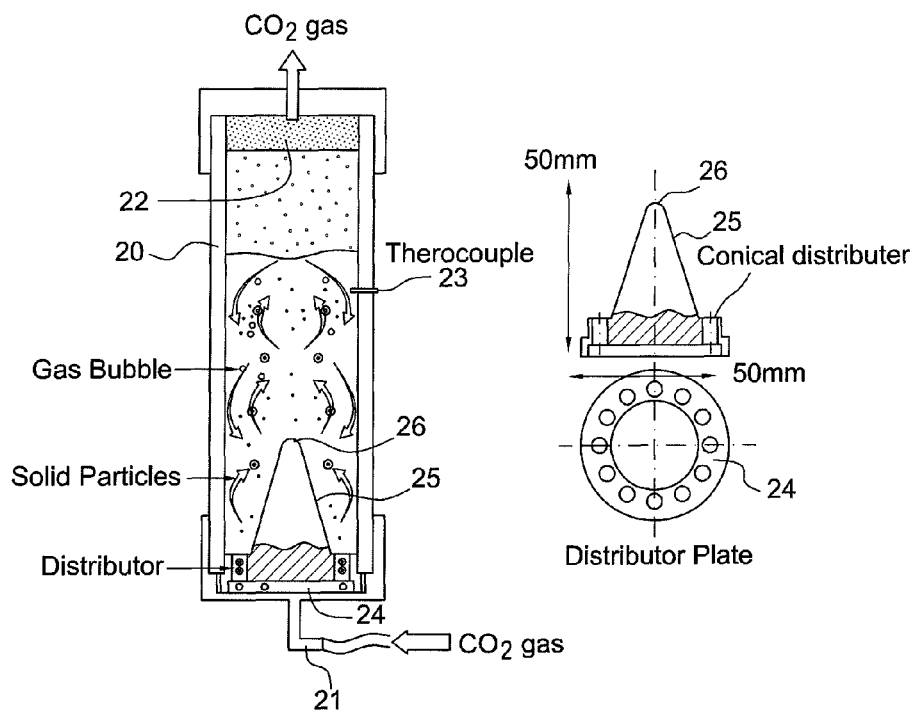
FIG. 1 is a diagrammatic representation of a fluidized bed reactor adapted for use in the carbonation process used in treating cement kiln dust in accordance with the present invention.
Figure 2:
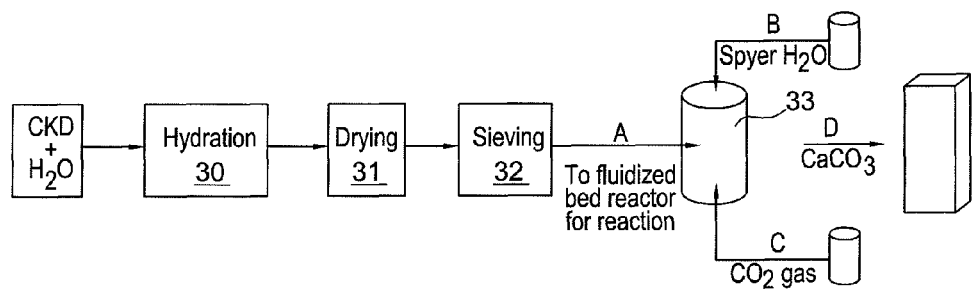
FIG. 2 is a diagrammatic representation of a method for treating cement kiln dust in accordance with the present invention.

In this invention, a gas fluidized bed is used to aid in the long-term stabilization of cement kiln dust. A fluidized bed is formed when a quantity of a solid particulate substance is forced to behave as a fluid; usually by the forced introduction of pressurized gas through the particulate medium. This results in a medium that has many properties and characteristics of normal fluids; such as the ability to free-flow under gravity, or to be pumped using fluid type technologies. It reduces the density of the medium; without affecting its elemental nature.

The principle of fluidization is simple and can be described as follows: When solid particles have the right size, shape and are sufficiently light (porous), a gas flow with a low flow rate (a few cm/s) will fluidize the powder. In gas solid systems, an increase in gas flow rate beyond minimum fluidization leads to instabilities with bubbling and channeling of the gas. At higher flow rates, fluidization becomes more violent and the movement of solids becomes more vigorous. This type of bed is referred to as an aggregative fluidized bed, a heterogeneously fluidized bed, a bubbling fluidized bed or simply a gas fluidized bed.

It is a particular feature of the process of the invention that such improvements may be experienced because:

1. The apparatus and method of the present invention have contributed to:
   a. Economically capturing flue gas $CO_2$ emitted by the cement industry and converting these greenhouse emissions into beneficial products;
   b. Stabilizing carbonated dust, which is intended for safe land disposal;
   c. Immobilizing contaminants at hazardous waste disposal sites;
   d. Reclamation of acidic soils;
   e. Minimizing emissions of $CO_2$; and
   f. Protecting human health and the environment.

2. Waste materials provide an inexpensive source of calcium mineral matter, and the environmental quality of the waste materials may be improved through pH-neutralization and mineral transformation.

3. High sulfates reduction after treatment of cement kiln dust. The percent of water soluble sulfate for untreated and treated cement kiln dust, resolved from short term anion leached test, was determined to be 93% and 7%, respectively. This in turn will greatly reduce the formation of syngenite [$K_2Ca(SO_4)_2 \cdot H_2O$], gypsum [$CaSO_4 \cdot 2H_2O$], ettringite [calcium aluminate trisulfate hydrate, $C_6AS_3H_{32}$], and monosulfate [calcium aluminate monosulfate hydrate, $C_4ASH_{18}$] precipitates.

4. The carbonation process contributes to the precipitation of $CaCO_3$ and ties up the available calcium present in the dust. High percent reduction of leached $Ca^{++}$, as indicated from ICP analysis for short- and long-term leaching tests, since the calcium originally present in the dust is tied up and retained as a solid in the form of a carbonate.

5. Most of calcium carbonate particles produced had a defined and fine shape, with diameters of less than 1 µm. However, much finer particles of different morphologies can be produced, which provides a suitable particle size of $CaCO_3$ as used for industrial applications.

Other advantages of the invention may include:

1. The treated cement kiln dust includes pure lime stone ($CaCO_3$) with specific morphology, structure, and particle size.

2. Ability in manufacturing lime cements from the treated cement kiln dust.

3. Fixation of soluble alkali metals and sulfates by carbonation.

4. Reduction of pH from 12 to about 9.

5. No effluent discharges.

6. Ability to use treated cement kiln dust in clinker making process as a raw material.

7. Ability to use treated cement kiln dust in waste management for solidification/stabilization of hazardous wastes and neutralization of acid mine drainage.

8. Using treated cement kiln dust in civil engineering such as stabilization of soft soils, treatment of expansive/swelling soils, backfilling, and sub-base materials.

9. Ability to use treated cement kiln dust in agriculture practices such as neutralization of acidic soils.

10. Ability to maximize the use of natural resources.

11. Ability to utilize waste materials such as $CO_2$ and cement kiln dust for the production of useful products.

12. Reduction of emission of greenhouse gases.

Fluidized Bed Reactor Apparatus

The fluidized bed reactor chamber is a Plexiglas column reactor 20 with an internal diameter of about 50 mm and an overall height of about 500 mm was designed and built for a method in accordance with a preferred embodiment of the present invention. The reactor 20 includes a gas feed, a flue gas outlet 22, sampling temperature measurements such as a thermo couple 23, and a pressure gauge (not shown). Carbon dioxide gas was injected through a special feeding tube 21 that extended into the bottom of the reactor 20 and connected to an inverted cone-shaped gas distributor 25 having a truncated apex 26. The gas is delivered to the distributor 25 by means of a distributor plate 24. The distributor plate 24 has several openings (12 symmetrical holes with a diameter of 3 mm). Commonly, the fluidizing gas is distributed via a plate located at the base of the reactor through which an ascending current of fluidizing gas passes, and on which base the particles rest when the reactor is shut down.

Fluidized Bed Reactor Principles

In a fluidized bed reactor the gas flows upward through the bed causing the solid particles of cement kiln dust to be suspended. The gas is then forced through the distributor up through the solid material. At lower gas velocities, the solids remain in place as the gas passes through the voids in the material. As the gas velocity is increased, the reactor reaches a stage where the force of the gas on the solids is enough to balance the weight of the solid material. This stage is known as incipient fluidization and occurs at this minimum fluidization velocity. Once this minimum velocity is surpassed, the contents of the reactor bed begin to expand and swirl around much like a boiling pot of water. Stable expansion of a cement kiln dust bed occurs over a finite interval of $CO_2$ gas flow beyond the point of minimum fluidization.

A bed of solid particles with a stream of air or gas passing upward through the particles at a rate great enough to set them in motion establishes a fluidized bed. An expanded bed is formed when the gas or airflow rate increases and particles move apart. A few visibly vibrate and move about in restricted regions. At still higher velocities of airflow, all the particles become suspended. At this point, the frictional force between a particle and gas balances the weight of the particles, the vertical component of the compressive force between adjacent particles disappears, and the pressure drop through any section of the bed approximates the weight of $CO_2$ gas and particles in that section. The bed is referred to as an incipiently fluidized bed or a bed at minimum fluidization. With an increase in gas flow rates beyond minimum fluidization, large instabilities with bubbling and channeling of air create different types of beds.

Cement Kiln Dust Treatment Process

The invention consists of the combinations and arrangements of steps which will be exemplified in the following descriptions. The different treatment processes are: hydration 30 (formation of calcium hydroxide); dehydration, i.e. drying 31; fractionation via sieving 32; and carbonation 33 (reaction of hydrated cement kiln dust with $CO_2$ gas in a fluidized bed reactor). These processes will be further described in the following examples.

EXAMPLE 1

Hydration of Cement Kiln Dust

The cement kiln dust samples were supplied by a cement factory in Al Ain, United Arab Emirates.

Samples were taken from open storage piles in a weathering area. The cement kiln dust consisted of 46% CaO, 12.63% $SiO_2$, 2.26% $Al_2O_3$, 2.08% $Fe2O3$, 0.89% MgO, 1.78% $K_2O$, 0.25% $Na_2O$, 1.56% $SO_3$, and 0.52% Cl.

When water is added to the cement kiln dust, the following set of reactions take place.

1. Quick lime is hydrated to form hydrated lime [calcium hydroxide, $Ca(OH)_2$] which is not stable in water. The chemical reaction is expressed by equation 1 as:

$$CaO(s)+H_2O(l) \rightarrow Ca(OH)_2(s) \; \Delta H(35°\,C.)=-65.47 \; KJ/mol. \quad (1)$$

2. Ionization of calcium hydroxide; pH rises to 12.3 as demonstrated by equation 2.

$$Ca(OH)_2 \rightarrow Ca^{2+}+2(OH)^- \quad (2)$$

3. When a pozzolan (reactive silica) is present in the system, the calcium silicate hydrates $[C_3S_2H_3]$ formed as a result of the reaction between lime and pozzolan that are stable in water. The relevant chemical reactions may be expressed as equation 3:

$$3CaO+2SiO_2+3H_2O \rightarrow 3CaO.2SiO_2.3H_2O \quad (3)$$

$(C_3S_2H_3)$

4. Similarly, when a pozzolan (reactive alumina) is present in the system, the calcium aluminate hydrates $[C_3AH_6]$ formed as a result of the reaction between lime and pozzolan that are stable in water. The relevant chemical reactions may be expressed as per equation 4:

$$3CaO+Al_2O_3+6H_2O \rightarrow 3CaO.Al_2O_3.6H_2O \quad (4)$$

$(C_3AH_6)$

5. Dissolution of sulfate minerals as demonstrated by equation 5.

$$M_xSO_4^-.nH_2O \rightarrow xM^{Y+}+SO_4^{2-}+nH_2O; \; x=1, y=2 \; or \; x=2, y=1 \quad (5)$$

6. Depending on the concentration of aluminate and sulfate ions in the solution, the precipitating crystalline products are either calcium aluminate trisulfate hydrate or the calcium aluminate monosulfate hydrate. In solutions saturated with calcium and hydroxyl ions, the former crystallizes as short prismatic needles and is also referred to as high-sulfate or by the mineralogical name, ettringite. The monosulfate is also called low-sulfate and crystallizes as thin hexagonal plates. The relevant chemical reactions may be expressed as per equations 6 and 7:

Ettringite $$6[Ca]^{2+}+[AlO_4]^-+3[SO4]^{2-}+aq. \rightarrow C_6AS_3H_{32} \quad (6)$$

Monosulfate $$4[Ca]^{2+}+[AlO_4]^-+[SO_4]^{2-}+aq. \rightarrow C_4ASH_{18} \quad (7)$$

Ettringite is usually the first to crystallize because of the high sulfate/aluminate ratio in solution phase during the first hour of hydration. Precipitation of ettringite contributes to stiffening (loss of consistency), setting (solidification of the paste), and early strength development, shrinkage upon drying and swelling upon hydration. Later, after the depletion of sulfate, ettringite becomes unstable and is gradually converted into a monosulfate phase.

Theoretical Extent of Hydration Process of Cement Kiln Dust

Figure 3:
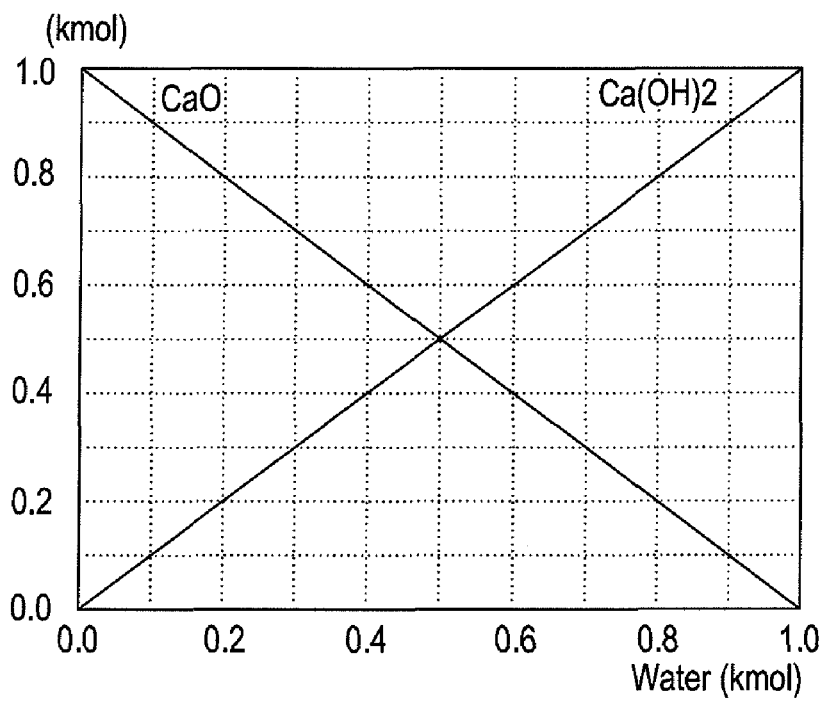
FIG. 3 is an equilibrium composition diagram for hydration process modeling using HSC software, depending on the amount of $H_2O$.

To evaluate the effect of the amounts of moisture content on product composition, the hydration process was modeled using HSC-4 chemistry software. The hydration of CaO, commercially referred to as quick lime, is an exothermic process releasing a great quantity of heat. The equilibrium composition curve of calcium hydroxide formation is shown in FIG. 3. The results indicate that the reaction is stoichiometry, i.e. one mole of calcium oxide reacts with one mole of water to produce one mole of calcium hydroxide. Therefore, 56 units (1 mole) of CaO plus 18 units (1 mole) of $H_2O$ results in 74 units (1 mole) of $Ca(OH)_2$. The ratio of $Ca(OH)_2$ to CaO is 74/56=1.32. This means that 1 kg of CaO and 0.32 kg of water will produce 1.32 kg of $Ca(OH)_2$ which is the minimum water required for the chemical reaction. Therefore, the formed $Ca(OH)_2$ contains 75.7% CaO and 24.3% $H_2O$.

To calculate the amount of water needed for hydrating the cement kiln dust, one needs to know the amount of CaO that exists in the cement kiln dust. Since the cement kiln dust contains 46% CaO, the amount of water needed to hydrate one Kg of cement kiln dust is 0.147 Kg of water. Such an amount of water will not be enough to hydrate the cement kiln dust because cement kiln dust contains additional amounts of oxides in the forms of alumina, silica, iron, potassium, etc. Therefore, the amounts of different oxides were measured and the required amounts of water were calculated according to their chemical reactions.

Factors Controlling the Hydration Process

Since the major oxide in cement kiln dust is CaO, hydration tests on the pure lime were investigated to evaluate the effect of lime to water ratio, degree of agitation, hydration time, temperature, and water chemistry. For optimizing hydration conditions, experiments on small patches were performed using 100 g of CaO with different distilled water ratios (1:1, 1:1.5, 1:2, 1:2.5, 1:3), at different temperatures (30, 40, and 50° C.), and different agitation rates (200; 400, and 600 rpm).

The process of adding water to calcium oxide is referred to as a hydration process or lime slaking. When the hydration process is done with just the right amount of water, the hydrate material is a dry powder and the process is called "dry hydration." On the other hand, when excess water is used for hydration, the resultant hydrate is a slurry form, and the process is called "slaking." It is further recommended to add quicklime to water, not the other way around, to avoid explosion.

Results from quick lime hydration experiments indicated that the hydration process depends on the following factors:

1. Lime to water ratio: It affects slaking time by affecting the slaking temperature.

Temperature will vary due to variation in water temperature, lime reactivity, and quality of water. A better way to maintain a correct lime to water ratio is to control the slaking temperature.

2. Slaking water temperature: It has a great influence on the slaking process and specific surface of the hydrate particles. Cool slaking water should not contact the dry lime. If cool water and lime come in contact, a condition called drowning takes place. Particles of hydrate formed under drowning conditions are very coarse and not very reactive.

3. Water chemistry: It is a major factor in the slaking process; presence of certain chemicals in the slaking water will accelerate or hinder the slaking process. Water with high dissolved solids generally causes excessive foaming, which results in operational problems. Sea water can effectively be used for slaking. However, the material of construction must take into consideration corrosion caused by chlorides.

4. Slaking time: It is the time required to complete hydration. This time varies from lime to lime. A high reactive lime will hydrate completely in 2 to 3 minutes. Medium reactive limes will hydrate completely in 5 to 10 minutes. Low reactive limes, hard-burned limes, and magnesium limes will hydrate in 15 to 30 minutes.

5. Degree of agitation: has an impact on the end product during the slaking process. Too little agitation will result in uneven temperature within the slaking chamber resulting in hot and cold spots.

Optimum Operating Conditions for Cement Kiln Dust Hydration Process

To evaluate the optimum operating conditions for cement kiln dust hydration, different weights of water (0.33, 0.50, 0.67, 0.83, 1 and 1.17 Kg), at 35±2° C., were added to 1 kg of cement kiln dust, then stirred mechanically at 600 rpm for 30 minutes. The mixture was then oven dried at a temperature of less of than 80° C.; for 24 hrs. The dried cement kiln dust was then sieved through a 1/16-inch (2 millimeter) grid, to decompose to the initial sized dust particles. The optimum operating conditions are summarized in Table 1.

TABLE 1

Optimization hydration parameters for cement kiln dust

| Parameters | Optimized results |
|---|---|
| Cement kiln dust/water weight ratio | 2/1.1 |
| Water temperature | 35-40° C. |
| Mixing speed | 600 rpm |
| Mixing time | 30 minute |
| Drying temperature | <80° C. |
| Drying time | 24 hrs |
| Sieving size | 1/16-inch |

EXAMPLE 2

Carbonation of Cement Kiln Dust

Carbonation Stages

Figure 4:
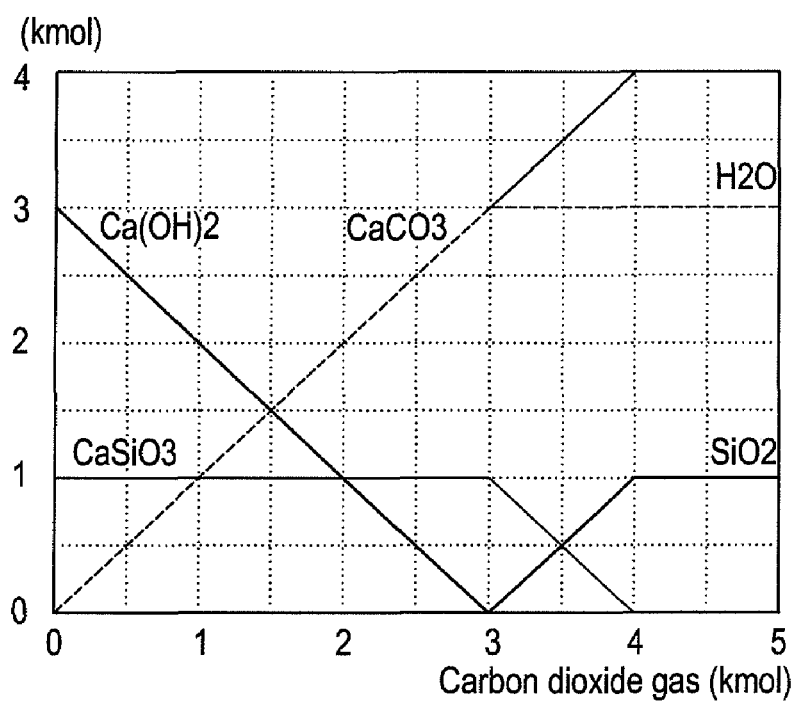
FIG. 4 is an equilibrium composition diagram for a carbonation process using HSC software, depending on the amount of $CO_2$.
Figure 5:
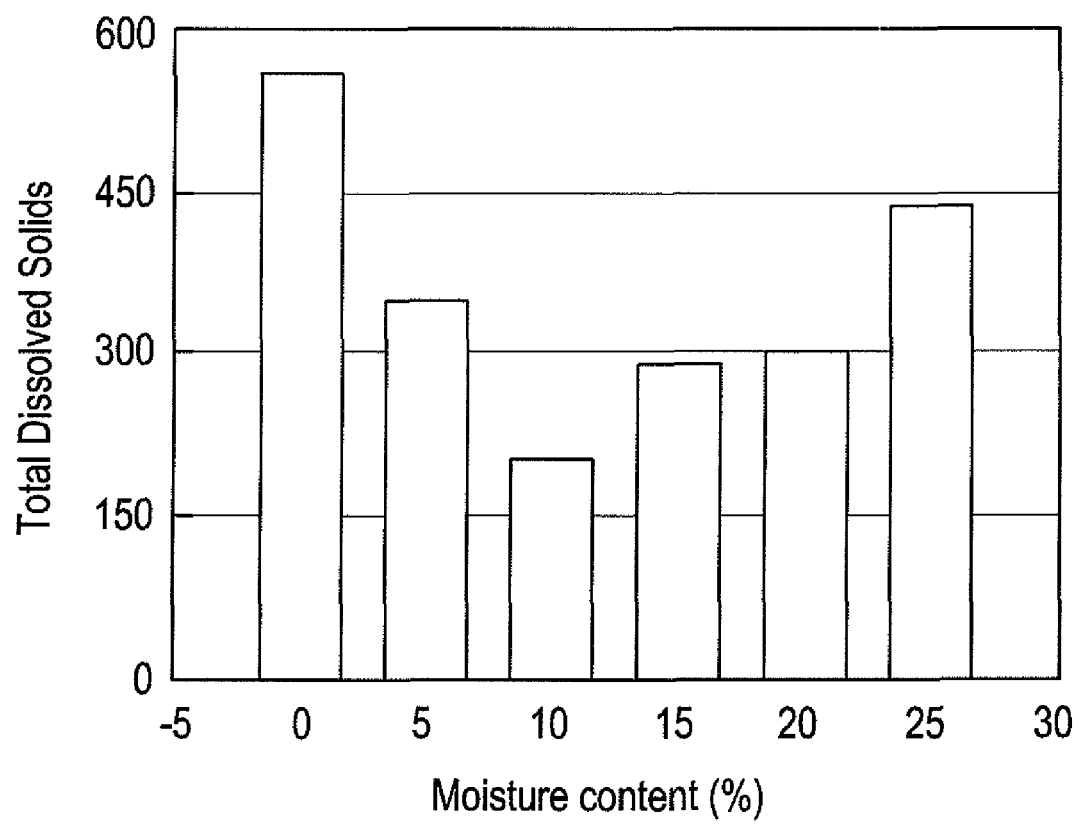
FIG. 5 is a graphical representation of the total dissolved solids as a function of moisture content during carbonation.

In order to determine the feasibility of possible calcium carbonate production, the processes were modeled using HSC-4 chemistry software and the results are shown in FIG. 4. Carbonation of concrete kiln dust is often described as two stage reactions. Based on thermodynamic analysis of the two reactions expressed by equations 8, and 9, it is clear that both reactions are spontaneous and exothermic.

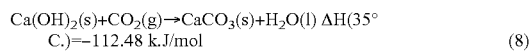

$$Ca(OH)_2(s) + CO_2(g) \rightarrow CaCO_3(s) + H_2O(l) \; \Delta H(35° C.) = -112.48 \; kJ/mol \quad (8)$$

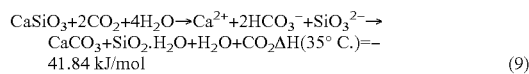

$$CaSiO_3 + 2CO_2 + 4H_2O \rightarrow Ca^{2+} + 2HCO_3^- + SiO_3^{2-} \rightarrow CaCO_3 + SiO_2 \cdot H_2O + H_2O + CO_2 \Delta H(35° C.) = -41.84 \; kJ/mol \quad (9)$$

The first reaction [$CO_2$—$Ca(OH)_2$] has more negative Delta G (−112.48 KJ/mol) than the second one [$CO_2$—$CaSiO_3$], where Delta G equals −41.84 KJ/mol. Hence, the first reaction will take place first. The second reaction will not proceed as long as there is some $Ca(OH)_2$ in equilibrium. This can be clearly seen from the results shown in FIG. 4. Because of the exothermic nature of the carbonation process of calcium hydroxide, higher temperatures could speed up carbonation of calcium silicate. As the carbonation reaction occurs, the water combined in hydroxides is released as free water. The maximum attainable conversion of calcium ions from the calcium silicate drops with limited $CO_2$ equilibrium composition as shown in FIG. 4. This means that the occurrence of the second reaction may be limited by limiting the stoichiometry amount of $CO_2$ Degree of Sequestration The degree of sequestration refers to the amount of $CO_2$ captured as a carbonated mineral mass compared to the mass of $CO_2$ that would be consumed if all available oxides were carbonated. For this study the degree of sequestration was determined by comparing the observed mass of $CO_2$ sequestered via thermo-gravimetric analysis (TGA) to the amount theoretically possible based on the elemental and phase composition of the pre-carbonated cement kiln dust. For pure oxides (e.g., CaO and $Ca(OH)_2$) the theoretical extent of carbonation is a function of basic stoichiometry:

$$CaO_{(s)} + CO_{2aq} \rightarrow CaCO_{3(s)} \quad (10)$$

Thus, every ton of CaO can potentially sequester up to 0.785 tons of $CO_2$. For cement kiln dust, the theoretical extent of carbonation can still be calculated as a function of stoichiometry. However, the extent also depends on the availability of those oxides for reaction. Cement kiln dust can host a number of reaction pathways to the capture of $CO_2$ in addition to equation 10:

$$Mg(OH)_2 + CO_2 \rightarrow MgCO_3 + H_2O \quad (11)$$

$$Ca(OH)_2 + CO_2 \rightarrow CaCO_3 + H_2O \quad (12)$$

$$2KOH + CO_2 \rightarrow K_2CO_3 + H_2O \quad (13)$$

$$2NaOH + CO_2 \rightarrow Na_2CO_3 + H_2O \quad (14)$$

Potassium and sodium oxides can also react with $CO_2$ to form bicarbonates. The amount of free oxide in cement kiln dust available for reaction depends on the type of kiln, source material, fuel type used, and the manner in which cement kiln dust was recovered from the system. Because of the wide range in cement kiln dust composition, it is difficult to specify a theoretical extent of carbonation. Nevertheless, estimates of $CO_2$ consumption can be made by talking into consideration the amount of calcite present in the pre-carbonated cement kiln dust, along with the CaO bound in anhydrite. Similar to estimates of $CO_2$, an estimate of the theoretical extent of carbonation in given cement kiln dust can be calculated as follows:

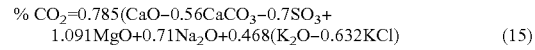

$$\% \; CO_2 = 0.785(CaO - 0.56CaCO_3 - 0.7SO_3 + 1.091MgO + 0.71Na_2O + 0.468(K_2O - 0.632KCl) \quad (15)$$

Where the % $CO_2$ refers to the mass of $CO_2$ consumed in the carbonation reactions compared to the original, un-reacted mass of the sample. The stoichiometry mass factors shown in equation 15 assume that all of the CaO (except that bound in $CaSO_4$ and $CaCO_3$ will react to form $CaCO_3$ all the MgO will react to form $MgCO_3$ and all of Na and will convert to Na and $K_2CO_3$. The mass factors for Na and K will be doubled if bicarbonates form instead of carbonates.

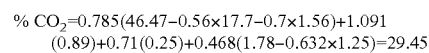

$$\% \; CO_2 = 0.785(46.47 - 0.56 \times 17.7 - 0.7 \times 1.56) + 1.091(0.89) + 0.71(0.25) + 0.468(1.78 - 0.632 \times 1.25) = 29.45$$

Therefore, the amount of $CO_2$ consumed in the carbonation reaction is 29.45% of the weight of the cement kiln dust.

Experimental Evaluation

After the hydration process described in example 1, the cement kiln dust was dried and sieved. The solid substrate material of cement kiln dust, with optimum moisture content, was then deposited in the fluidized bed reactor to be in contact with pressurized $CO_2$ for initiation of carbonation. The rate of dissolution of $Ca(OH)_2$ into $Ca^{2+}$ depends on the dissolution pressure and moisture content while, the reaction rate of calcium ions combining with carbonate ions is instantaneous. Therefore, the rates of formation of calcium and carbonate ions are the primary limitations for the overall reaction rate, more calcium hydroxide dissolves to equalize the concentration of calcium ions. With a pressurized $CO_2$ gas into the fluidized bed reactor and moist calcium hydroxide; the overall reaction will proceed rapidly.

During the carbonation process, a rapid temperature was observed over a period of 7-15 minutes. The maximum evolved temperature was 86° C. This may be attributed to the exothermic nature of the carbonation process. Additionally, the exposure of di-calcium silicate in cement kiln dust powder to $CO_2$ and moisture produced a noticeable exothermic reaction.

Optimization of the carbonation process

The following parameters were investigated to optimize the carbonation efficiency:

1. Moisture content: Moisture content is an important parameter of the reaction; the reaction does not completely occur for totally dried samples. It is known that water is necessary to promote the reaction of $CO_2$ but too much water limits the reaction due to the blockage of the pores in the solid. Hydration and dissolution of $CO_2$ occur in the presence of water, as well as the dissolution of $Ca^{2+}$ ions from the solid phase, which reacts with the $CO_2$ to form calcium carbonate. At low water-to-solid ratios, the gas permeability is high and the $CO_2$ effectively diffuses into the material. However, with the increase in water content, the pores in the cement kiln dust are effectively sealed off. The diffusion of gas into the pore system is hindered, and inhibits the reaction.

Hydrated cement kiln dust waste, with different humidity ranging from 0-25% was exposed to $CO_2$ in the fluidization bed reactor. The moisture content was optimized through the measurements of the total dissolved solids (TDS) after shaking the product in distilled water for 72 hrs. FIG. (5) indicates that; cement kiln dust with humidity of 7-10% (w/w) seems to be the best option. Above 12% there is a decreasing tendency for the carbonation process. This could indicate that the reaction mainly occurs in the pores of the solid matrix.

Besides the change in the TDS after carbonation, there is also a change in the mass of the treated cement kiln dust. The formation of solid calcite induces an increase in the sample mass, which can be directly related to the amount of trapped carbon dioxide.

2. Influence of sieving: Carbonation success was evaluated for un-sieved samples and samples sieved through 16-mesh sieve, at the same humidity percentage of 10%. Comparing an un-sieved cement kiln dust sample and 16-mesh sieved sample indicates that it would be better to keep sieving the samples, in order to increase the exchange surfaces. Grinding was expected to activate the materials chemically through reducing particle size, increasing exposed surfaces for chemical reactions, and introducing electrostatic charges on the surfaces.

3. $CO_2$ flow rate: At sufficiently high $CO_2$ gas flow rate, beyond the so-called point of minimum velocity, the bed can be observed to be traversed. Also, it was noticed that the time required for completing the carbonation reaction decreases with increasing $CO_2$ flow rate.

4. Carbonation time: Samples were exposed to $CO_2$ for different times ranging from 5-60 minutes. The results indicated that carbonation reaction may be essentially completed in 20-60 minutes. However, in air, the carbonation reaction may be completed in 24 hours and will be limited to the externally exposed surfaces without full penetration.

The optimum conditions for the carbonation process are summarized in Table 2.

TABLE 2

Optimized carbonation parameters for cement kiln dust

| Parameters | Optimized results |
| --- | --- |
| Moisture content | 7-12% |
| Temperature | 25° C. |
| Time | 20-60 minutes |
| $CO_2$ concentration | 100% |
| $CO_2$ flow rate | 3 liter/min |
| $CO_2$ pressure | 1.5 bar |

EXAMPLE 3

Physical Properties of Untreated and Carbonated Cement Kiln Dust

The physical and chemical characteristics of the cement kiln dust, which is collected for use outside of the cement production facility, will depend in part on the method of dust collection employed at the facility. Free lime can be found in cement kiln dust, and its concentration is typically highest in the coarser particles captured closest to the kiln. Finer particles tend to exhibit higher concentrations of sulfates and alkalis. If the coarser particles are not separated out and returned to the kiln, the total dust will be higher in free lime.

The pH of the original cement kiln dust water mixtures is very close to the pH of a solution saturated in Portlandite. It contains significant alkalis, and is considered to be caustic. After carbonation, however, the alkalinity of cement kiln dust is reduced since the calcium oxide is converted into calcium carbonate. As the concentration of $OH^-$ decreased, the concentration of $Ca^{++}$ in solution also decreased since the hydroxide is more soluble than the carbonate. Table 3 lists some typical physical properties of cement kiln dust.

TABLE 3

Typical ranges of physical properties of untreated and carbonated cement kiln dust

| | Cement kiln dust | |
| --- | --- | --- |
| Measurement | Untreated | Carbonated |
| Gradation 75% passing | 0.030 mm | 0.010 mm |
| pH | 12-12.5 | 8.5-9.5 |
| Electrical conductivity (μs) | 94.1 | 33.3 |
| TDS (mg/l) | 560 | 201 |
| LOI | 25.17 | 35.57 |

A higher loss on ignition (LOI) means that a dust sample contains a higher percentage of bound water within its chemical structure and less calcium oxide is available to react. A lower LOI indicates less bound water, and more free lime for hydration reactions.

EXAMPLE 4

Mineralogical Composition of Untreated and Carbonated Cement Kiln Dust

To determine the mineral composition of the carbonated cement kiln dust, samples of cement kiln dust were analyzed using a Philips x-ray diffractometer model PW/1840, with Ni filter, Cu-Kα radiation ($\lambda$=1.542 Å) at 40 kV, 30 mA and scanning speed 0.02°/S. The diffraction peaks between 2θ=2° and 2θ=80° were recorded. The untreated cement kiln dust samples contained mainly limestone (CaO) as a main component, quartz ($SiO_2$ and calcite ($CaCO_3$ which actually presented in the raw materials, with some hydrated lime (Portlandite $Ca(OH)_2$) arcanite ($K_2SO_4$ and sylvite (KCl), alkali sulfate (sodium/potassium sulfate) and sulfate phases such as gypsum ($CaSO_4.H_2O$) and syngenite ($K_2Ca(SO_4)_2.H_2O$) as shown in Table 4.

TABLE 4

Main mineral phases in cement kiln dust

| Mineral phases | Formula | Cement kiln dust Untreated | Carbonated |
|---|---|---|---|
| Lime | CaO | x | |
| Portlandite | $Ca(OH)_2$ | x | x |
| Quartz | $SiO_2$ | x | x |
| Anhydrite | $CaSO_4$ | x | |
| Halite | NaCl | x | |
| Sylvite | KCl | x | |
| Calcite | $CaCO_3$ | x | x |
| Arcanite | $K_2SO_4$ | x | |
| Alkali sulfate | $Na_2SO_4$ | x | |
| Gypsum | $CaSO_4\cdot 2H_2O$ | x | |
| Syngenite | $K_2Ca(SO_4)\cdot 2H_2O$ | x | |

Figure 6A:
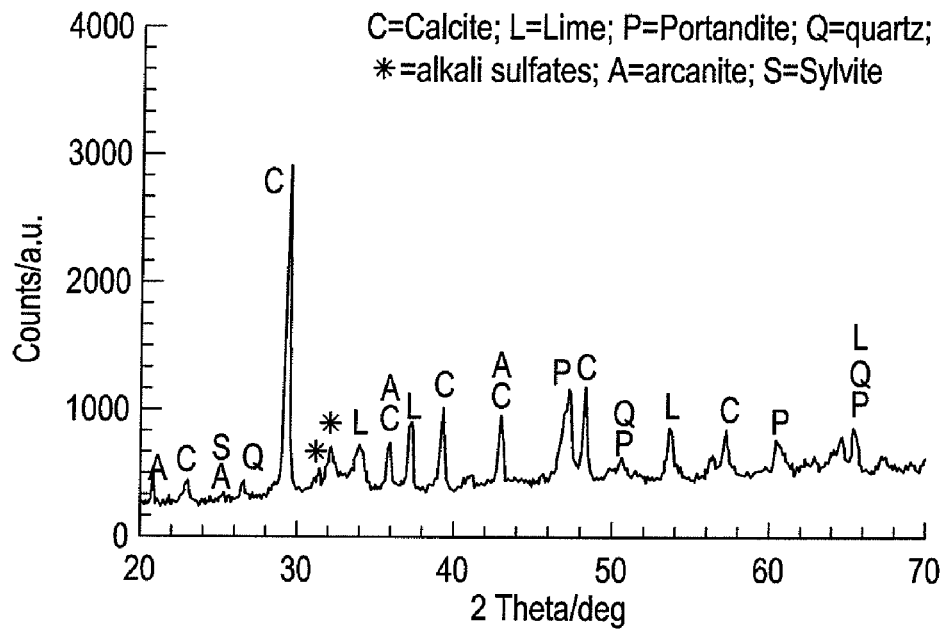
FIG. 6(a) illustrates an X-ray diffraction analyses resulting from untreated cement kiln dust.
Figure 6B:
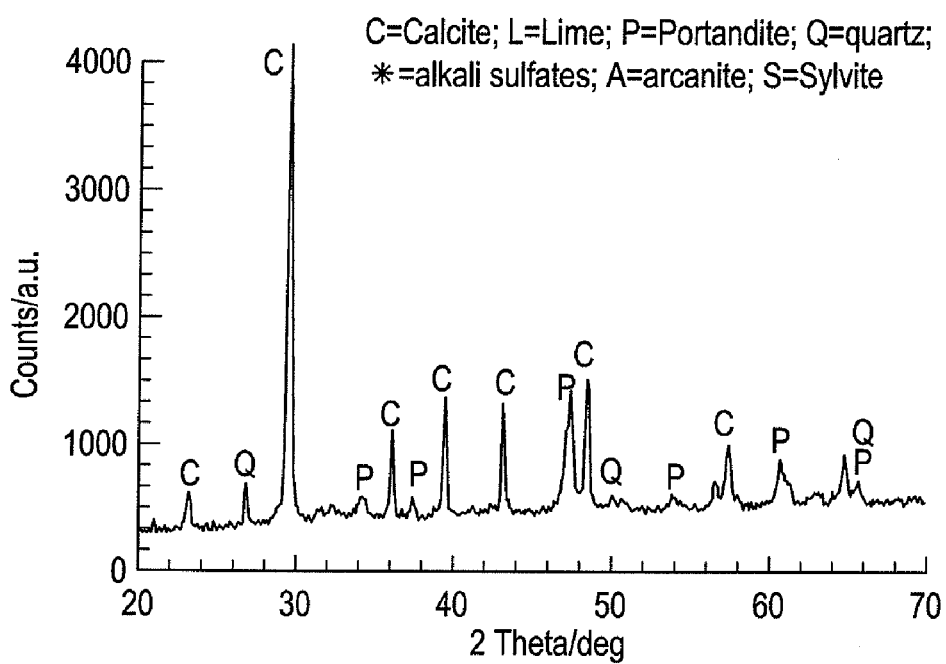
FIG. 6(b) shows an X-ray diffraction analyses result corresponding to cement kiln dust after hydration and carbonation.

FIGS. 6a and b are representatives of XRD diffractograms for untreated (stocked) and carbonated cement kiln dust samples. The untreated cement kiln dust sample contains mainly limestone (CaO) as a main component, quartz ($SiO_2$ and calcite ($CaCO_3$) which actually presented in the raw materials, with some hydrated lime, arcanite and sylvite, alkali sulfate (sodium/potassium sulfate) and sulfate phases such as gypsum and syngenite.

X-ray diffraction identification of the carbonated cement kiln dust sample showed that the absolute intensities of calcite lines had increased. There are some phases that disappeared after carbonation including; lime, calcium sulfate, alkali-calcium double salts, due to consumption of calcium ion in the formation of calcium carbonate. This indicates that the carbonation forces the precipitation of calcium carbonates and ties up the available calcium present in the cement kiln dust, thereby greatly reducing the formation of syngenite and gypsum precipitates which would otherwise contaminate the residual cement kiln dust solids. X-ray diffraction identification of the carbonated precipitated solids showed the presence of some Portlandite indicating that both $CO_3^-$ and OH were present and the pH in the range of 8.5-9.5. At low pH, namely below 9, $HCO_3^-$ was present in addition to $CO_3^-$.

EXAMPLE 5

Thermal Characteristics of Untreated and Carbonated Cement Kiln Dust

Thermo-gravimetric analysis before and after carbonation of cement kiln dust was performed with a thermo gravimetric analyzer (TGA 7 Perkin-Elmer), in a temperature range of 50-1000° C. at a heating rate of 20° C./min. The carbonate content was calculated from the weight loss on ignition.

Figure 7:
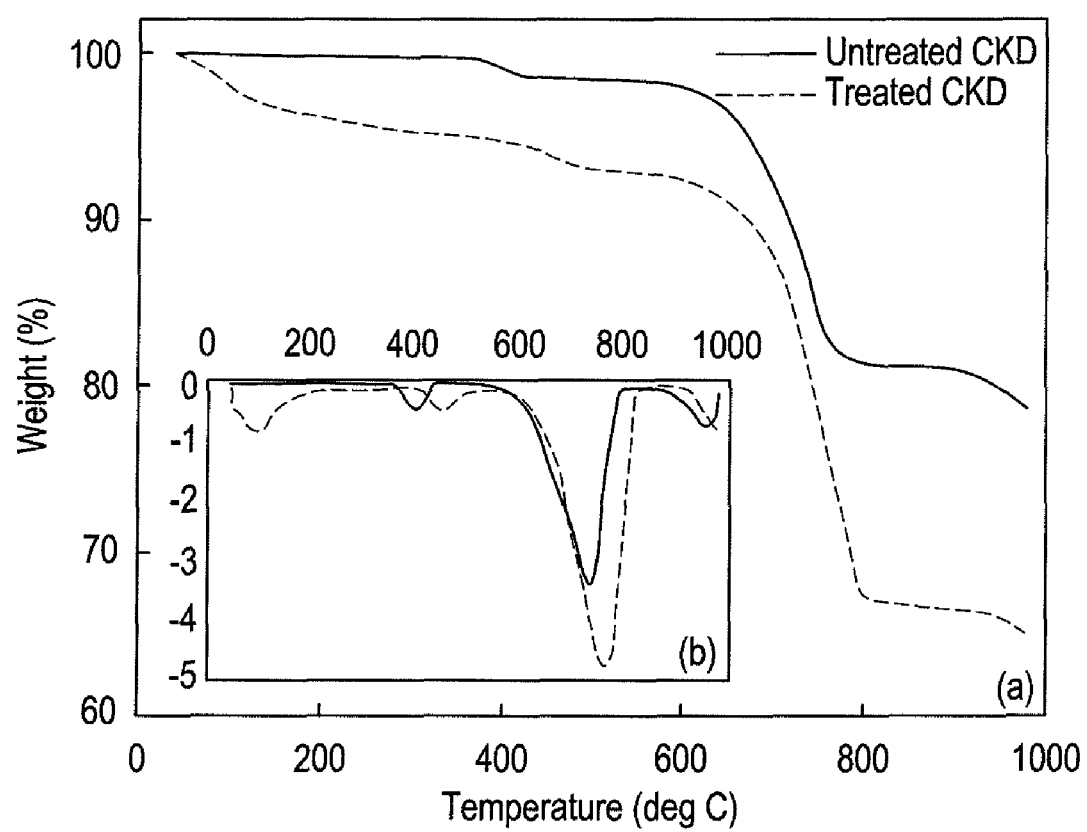
FIG. 7 shows TGA(a) and DTG(b) curves for untreated and treated cement kiln dust waste samples with a heating range of 20° C./min.

The thermo-gravimetric analysis (TGA) and the derivative of thermo-gravimetric (DTG) curves, for untreated and carbonated cement kiln dust samples, showed a good repeatability whatever the carbonation condition. FIGS. 7a and b show that the loss of water in carbonated cement kiln dust sample occurred less than 200° C. due to hydrating water. Also, as the carbonation reaction occurs, the water combined in hydroxide is released as free water, equation 8. Above 400° C., there is an endothermic that corresponds to the decomposition of calcium hydroxide into calcium oxide and water, equation 16.

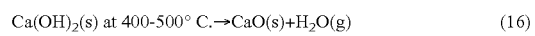

$$Ca(OH)_2(s) \text{ at } 400\text{-}500° C. \rightarrow CaO(s)+H_2O(g) \quad (16)$$

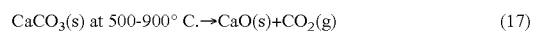

$$CaCO_3(s) \text{ at } 500\text{-}900° C. \rightarrow CaO(s)+CO_2(g) \quad (17)$$

The decomposition of calcium carbonate between 500 and 900° C. is considered to be the carbonate content of the samples, equation 17. From TGA, the percent weight loss of carbonated content for untreated cement kiln dust is determined to be 17.7% where, carbonated cement kiln dust is 26.77%. Hence, the carbonation process has contributed to an increase in the content of calcium carbonate within the treated cement kiln dust by about 52%. The carbonation efficiency is defined as the ratio between the carbon uptakes from experiments to that calculated theoretically by equation 15. Therefore, the carbonation efficiency is 26.77/29.45=91%, which suggested that the treatment method used in this invention (i.e., fluidized bed reactor) is very successful.

EXAMPLE 6

Microstructure Characteristics of Untreated and Carbonated Cement Kiln Dust

Figure 8:
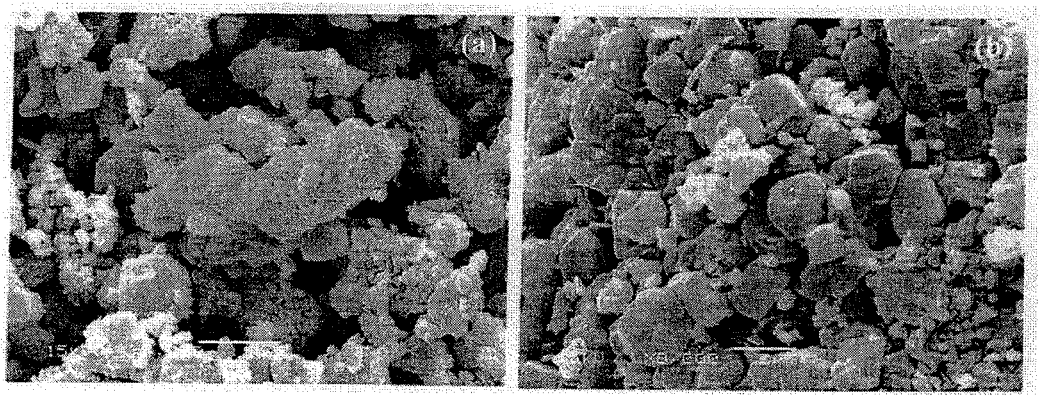
FIG. 8 is a scanning electron microscope image of (a) fresh cement kiln dust supplied by a cement factory produced from a dry kiln process and (b) one month stock pile cement kiln dust.

The microstructure results obtained using the scanning electron microscopy has indicated that the characteristics of cement kiln dust particles, such as morphology and particle size, can vary greatly under storage conditions. The scans of the fresh and stockpiled cement kiln dust are obtained by using the scanning electron microscope (JSM-5600 Joel microscope equipped with an energy Dispersive x-ray detector for chemical analysis) as shown in FIGS. 8a and 8b. The micrographs indicate that there are significant morphological differences between the untreated and carbonated cement kiln dusts. The untreated cement kiln dust particles are coarse, irregular, and random in shape and size, with a mean particle size of approximately 7 μm. The stockpiled cement kiln dust shows clear evidence of reaction products in the form of cubes. These results are expected because of the changes in microstructure occurring as a result of chemical reactions (e.g., hydration due to moisture absorption and surface carbonation).

Figure 9:
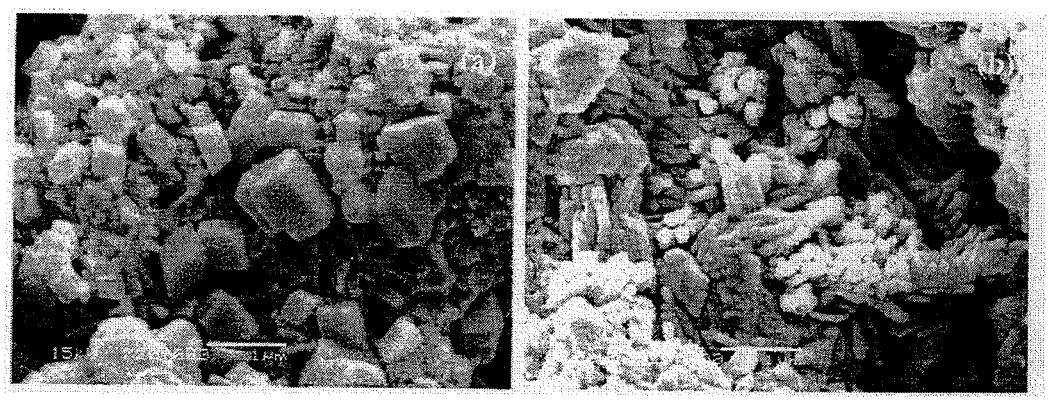
FIG. 9 is a scanning electron microscope image of the carbonated cement kiln dust, showing two morphological structural of calcium carbonate; (a) rhombohedra structures and (b) aragonite structures.
Figure 10A:
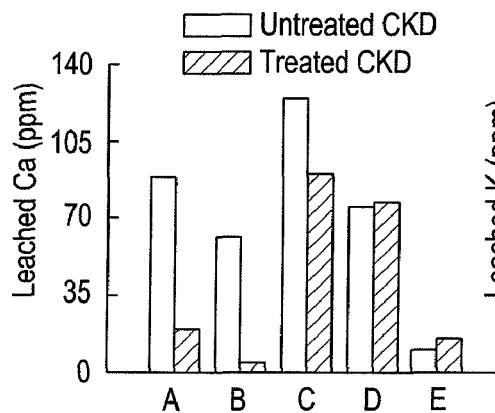
FIG. 10(a, b, c, d, e, and f) are graphical representations of leaching untreated and treated cement kiln dust tested for 72 hours in different solutions; A) is distilled water, B) is boiling water, C) is sea water, D) is acidic universal buffer solutions, E) is a basic universal buffer solution.
Figure 10B:
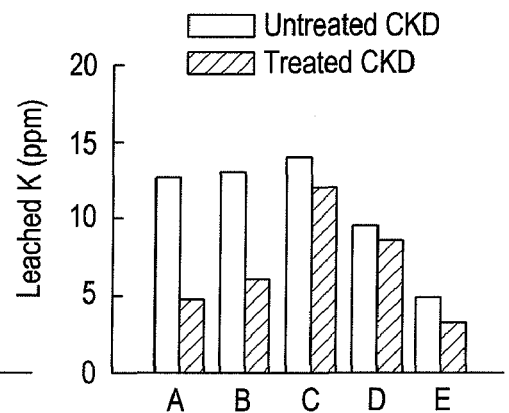
Figure 10C:
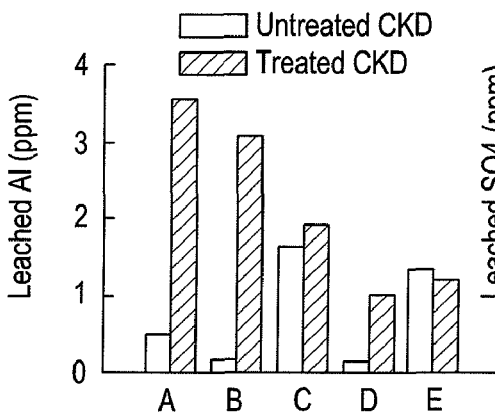
Figure 10D:
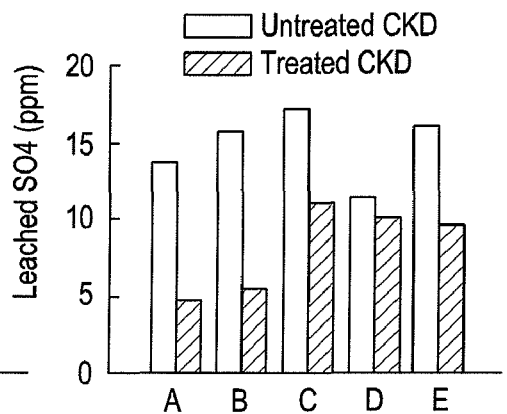
Figure 10E:
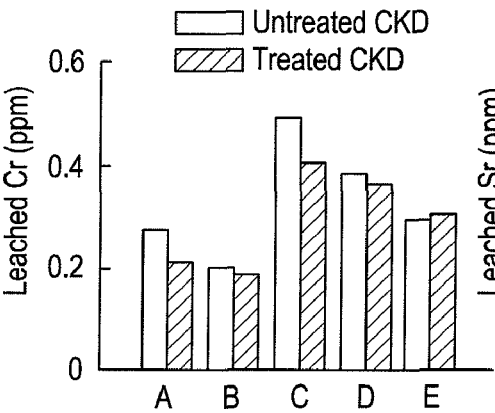
Figure 10F:
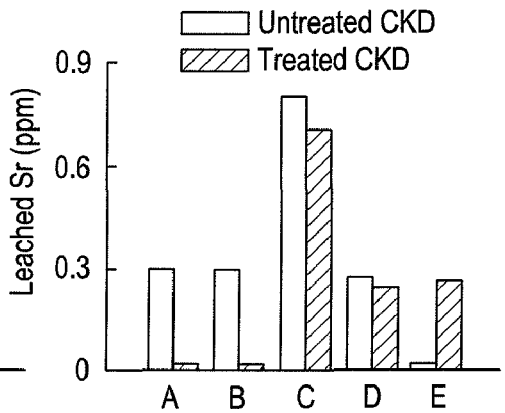

The stabilization mechanism of cement kiln dust, after carbonation, can be evaluated by investigating the characteristics of the formed particles, such as morphology and size. It has been shown that there are two forms of $CaCO_3$ morphology; well defined rhombohedra calcite particles, and uniform needle like aragonite particles, with a mean particle size of approximately one or less μm as revealed in FIGS. 9a and b. The morphology and particle size can vary greatly in the carbonation process, according to precipitation conditions such as:

a. dispersion of $CO_2$ b. presence of divalent cations.

c. the ionic ratio of $[Ca^{2+}]/[CO_3^{-2}]$.

d. pH.

e. the elevated temperature during carbonation process, which affect the crystalline form and particle size distribution.

There are various forms of $CaCO_3$ morphology namely rhombic calcite, needle like aragonite and spherical vaterite that vary according to precipitation conditions. It has also been observed that the initial super saturation and temperature of the $Ca(OH)_2$ slurry determined the proportion of calcite, aragonite and vaterite shaped particles. It was concluded that saturation level and the ionic ratios affect the crystalline form and the particle size distribution. Others described the $CaCO_3$ morphology change as being related to the pH and super saturation levels of the $Ca(OH)_2$ solution. The precipitation process usually produces precipitated $CaCO_3$ particles that are of spindle shape and having a particle size of about 2 μm.

EXAMPLE 7

Anions and Cations Leached from Untreated and Carbonated Cement Kiln Dust

One of the most important criteria for disposal of cement kiln dust to landfill or reuse of wastes is the release of hazardous compounds to the surrounding environment.

Experimental results have indicated that cement kiln dust has very high alkali, and high sulfate contents. The alkalis exist as alkali sulfates, such as arcanite ($K_2SO_4$), $NaSO_4$ and sylvite (KCl), and an assemblage of oxidized products such as lime. These products are unstable or highly soluble at earth surface conditions. When cement kiln dust contacts water, these products will either dissolve completely or more stable and less soluble secondary phases will precipitate. Thus, the concentration of some constituent elements in cement kiln dust) leachate will be controlled by the solubility of the secondary precipitates while, the concentration of others will be controlled by their availability to the leachate solutions and by their diffusive flux into the solution from the leaching of primary phases over time. To differentiate between these two classes of elemental behavior, it is recommended to conduct leaching tests on a particular waste at least at two different solid/water ratios. Then, if an element's concentration does not double when solid/water ratio is halved, there must be a solid phase control on its concentration in solution.

The observed leaching test was carried out in accordance to the British Standard BS EN 12457: 2002, which is designed to examine the short-term and long-term leaching behavior for landfills. It is a two-step leaching test with liquid-to-solid ratio of 10 L/kg. The cement kiln dust was leached at liquid-to-solid ratio of 2 L/kg for 6 hours of end-over-end mixing and then filtered. The residues were leached further at liquid-to-solid ratio of 8 L/kg for 18 hours. The leachate was filtered with a 0.45 μm filter paper and then divided into two parts. The first part was measured by Ion-Chromatography (DIONEX IC 90) for the chloride and sulfate contents. The second part was acidified with nitric acid to pH<2 for metal analysis. The concentration of the major elements Ca, K, Na and minor elements Sr, and Cr in leachates were analyzed by ICP.

TABLE 5

Anions leaching values for the cement kiln dust wastes in landfills (mg/kg), obtained by Ion-Chromatography:

| Leaching Test | Time (hrs) | ratio of water to cement kiln dust | Cement kiln dust | | | |
|---|---|---|---|---|---|---|
| | | | Untreated | | Carbonated | |
| | | | $SO_4$ | Cl | $SO_4$ | Cl |
| Short Term | 6 | 2 L/kg | 1736.53 | 1286.86 | 112.44 | 673.90 |
| Long Term | 18 | 8 L/kg | 576.01 | 376.01 | 150.026 | 338.56 |

The sulfate and chloride concentrations were obviously lowered after carbonation as shown in Table 5. When carbon dioxide was reacted with the cement kiln dust, calcium carbonate ($CaCO_3$) is formed. Since $CaCO_3$ is two orders of magnitude less soluble than the calcium sulfates (0.01 to 0.02 g/L as opposed to 2 to 3 g/L), the calcium is effectively tied up, thereby lowering alkalis and sulfate in the solution. For untreated cement kiln dust sample, the concentrations of leached Ca, Na and K are very high and result from the high solubility of minerals bearing these elements, such as halite and sylvite. The release of other elements, such as Sr and Cr, was found in lesser amounts. Table 6 shows the change in the metals release after carbonation.

TABLE 6

Metals leaching values for the cement kiln dust waste in landfills (mg/kg), obtained by ICP analysis:

| Leaching Test | Time (hrs) | Ratio of water to cement kiln dust | cement kiln dust | | | | | | | | | |
|---|---|---|---|---|---|---|---|---|---|---|---|---|
| | | | Untreated | | | | | Carbonated | | | | |
| | | | Ca | K | Na | St | Cr | Ca | K | Na | St | Cr |
| Short Term | 6 | 2 L/kg | 1418 | 2093 | 226 | 7.5 | 17 | 202 | 640 | 105 | 0.5 | 11 |
| Long Term | 18 | 8 L/kg | 1399 | 701 | 78.8 | 11.8 | 11 | 132 | 446 | 46.8 | 0.3 | 5.3 |

EXAMPLE 9

Durability of Treated Cement Kiln Dust

Examination of the durability of cement kiln dust is an essential part of the overall disposal system performance assessment methodology. The availability of the cement kiln dust waste dust contents was displayed by subjecting the untreated and treated cement kiln dust to multiple environments tested solutions; distilled water, boiling water, sea water, acidic and basic universal buffer solutions. One gram of waste cement kiln dust was suspended in 100 ml distilled water and subjected to vigorous shaking for 72 hrs. Metal leaching was measured using ICP analysis.

When untreated cement kiln dust is brought into contact with water, high concentration of sulfates and alkali metals Ca, K, Na and Al are leached. Other constituents are leached to a lesser extent such as Cr and Sr. In treated cement kiln dust, the concentration of released sulfate and alkali metals is decreased as indicated in FIG. 10. The leached elements show the following characteristics:

1. The over all leachated Ca in treated cement kiln dust solutions were clearly decreased compared with untreated one. This is due to the conversion of soluble calcium hydroxide to insoluble precipitated $CaCO_3$.

2. The leachated Ca quantity in boiling water is less than that leachated at 25° C.; this phenomenon can be illustrated as follow; some of calcium carbonate combined with $H^+$ which is saturated with carbon dioxide to form the soluble calcium bicarbonate as demonstrated by equation 18. Boiling water promotes the formation of carbonate from the bicarbonate and precipitates calcium carbonate out of solution, reducing the leached calcium as demonstrated by equation 19.

$$CaCO_3 + CO_2 + H_2O \rightarrow Ca(HCO_3)_2 \qquad (18)$$

$$Ca(HCO_3)_2 \text{ (boiling)} \rightarrow CaCO_3 + CO_2 + H_2O \qquad (19)$$

3. The leachated K was also decreased after treatment of cement kiln dust. This can be attributed to the conversion of potassium hydroxide to potassium carbonate, producing difference in solubility's, where 100 gm KOH dissolves in 50 ml $H_2O$ while 112 gm $K_2CO_3$ dissolves in 100 ml $H_2O$.

4. Cement kiln dust leach test results, at different environments, showed high concentrations of leachated sulfate, when cement kiln dust is brought into contact with water. After carbonation more reduction of released sulfates has been proven. After the structure is fully carbonated, the alkali metals are effectively tied up as carbonates thus, preventing formation of alkali sulfates. The leached sulfate in the basic medium can be attributed to the intensive interaction between sulfates and sodium hydroxide in the alkaline buffer.

5. The high product of leached alkali metals and sulfates in sea water is due to the interaction between cement kiln dust and sea water salts resulting in the formation of water soluble compounds, which are then leached away.

6. With respect to Cr and Sr, the leachated amounts are relatively low. They actually have very low reaction with different solutions, coupled with the potential of the anionic forms of these elements to proxy for $SO_4$ in the gypsum structure. Carbonation leads us to speculate that quantities of these elements were reduced due to reduction of sulfates.

Figure 11:
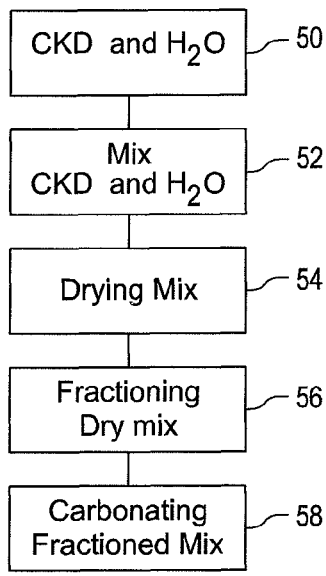
FIG. 11 is a flow chart illustrating one embodiment of the invention.

FIG. 11 illustrates a process in accordance with the first preferred embodiment of the invention wherein a mass of cement kiln dust and a mass of water are provided in step 50. The kiln dust and water are mixed in step 52 with Heidolph mechanical stirrer Model RZR1 and a maximum speed of about 600 rpm for about 30 minutes then dried in step 54 at a temperature of below about 80° C. for a period of about 24 hours. The dried mixture is then fractionated in step 56 by sieving through a screen with $\frac{1}{16}^{th}$ mesh openings. The fractionated moistened cement kiln dust is then carbonated in the fluidized bed reactor, using pressured $CO_2$ at moisture content in the range of 7-12% in step 58.

Figure 12:
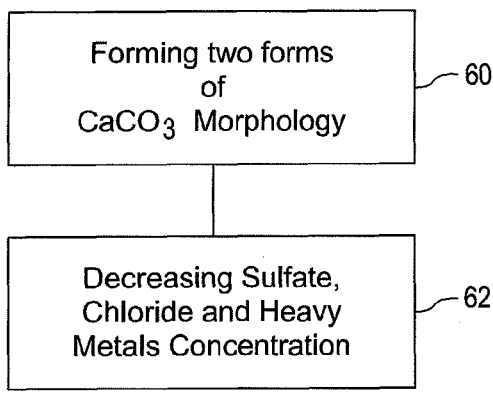
FIG. 12 is a portion of flow chart illustration further steps in a process according to one embodiment of the invention.

FIG. 12 illustrates further steps included in one embodiment of the invention. These steps are added to the steps shown in FIG. 11 and include the steps of forming two forms of calcium carbonate in step 60. In step 62, the sulfate, chlorides, and heavy metals such as; strontium and chromium concentrations are reduced.

Figure 13:
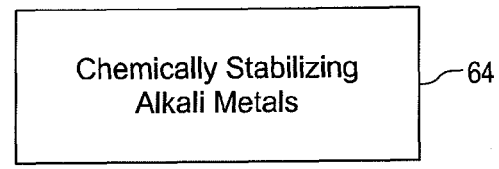
FIG. 13 is a portion of a flow chart illustrating a further step in a process according to another embodiment of the invention.

As shown in FIG. 13 the alkali metals are stabilized in step 64.

Figure 14:
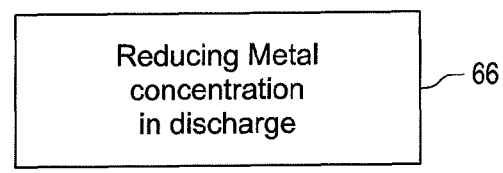
FIG. 14 is a portion of a flow chart illustrating a step in a further embodiment of the invention.

A further embodiment of the invention is illustrated in FIG. 14 where the metal concentrations in the discharge from the embodiment shown in FIG. 11 are reduced in step 66.

Figure 15:
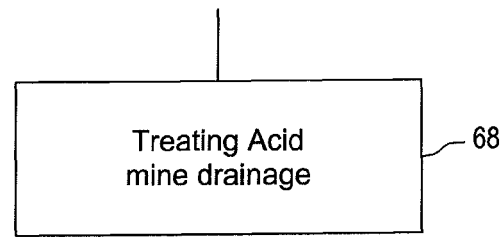
FIG. 15 is a portion of a flow chart illustrating an additional step in a still further embodiment of the invention.
Figure 16:
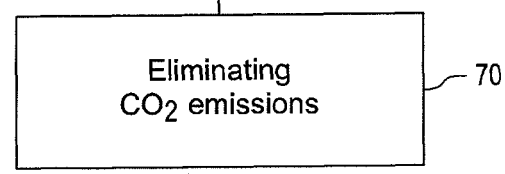
FIG. 16 is a portion of a flow chart illustrating yet another embodiment of the invention.

A subsequent step to the process of FIG. 11 is shown in FIG. 15. That step 68 uses the treated kiln dust from step 58 or 62 or 64 or 66 to treat acid mine drainage. Further, as shown in FIG. 16 the process of the present invention may also include step 70 for reducing or eliminating carbon dioxide emissions.

While the invention has been described in connection with its preferred embodiment, it should be recognized that changes and modifications may be made therein without departing from the scope of the appended claims.

What is claimed is:

1. A method for treating waste cement kiln dust containing alkaline metal salts comprising the steps of:
   a.) providing a cement kiln dust containing alkaline metal salts and water;
   b.) mixing the kiln dust and water to form a mixture containing calcium hydroxide by the hydration process;
   c.) drying the mixture from step b);
   d.) fractionating the dried mixture from step c) by sieving;
   e.) providing a fluid bed column reactor including an inverted cone-shaped gas distributor with a base, a truncated apex and a distributor plate having a plurality of openings disposed in a generally circular array at said base through which an ascending current of fluidized gas passes and on which base the particles rest when the reactor is shut down; and
   f.) carbonation of the dried fractionated and hydrated mixture from step d) with cement kiln exhaust gas containing a pollutant selected from the group consisting of acidic oxides of sulfur, nitrogen, carbon, halogen compounds and mixtures thereof in the fluid bed reactor to form a stable material.

2. A method for treating cement kiln dust according to claim 1 in which the cement kiln dust/water weight ratio is about 2 to about 1.1, the water temperature is about 35° to about 45° C., and in which mixing is done at about 600 rpm for about 30 minutes.

3. A method for treating cement kiln dust according to claim 1 wherein an unstable compound of hydrated lime is formed, the pH rises to 12.3 and stable compounds including calcium silicate hydrates and calcium aluminate hydrates are formed.

4. A method for treating cement kiln dust according to claim 1 in which the drying step c) is done at less than 80° C. for a period of about 24 hours.

5. A method for treating cement kiln dust according to claim 1 in which the mixture from step b) is sieved through a $\frac{1}{16}^{th}$ inch mesh sieve.

6. A method for treating waste cement kiln dust according to claim 1 which includes an apparatus and step for reacting carbon dioxide with hydrated cement kiln dust.

7. A method for treating waste cement kiln dust according to claim 6 in which the apparatus and step are in a fluidized bed reactor chamber including gas feeds, a flue gas outlet, sampling feature, temperature measurement and a pressure gauge.

8. A method for treating waste cement kiln dust according to claim 7 in which gas is injected through a feeding tube into the bottom of the reactor through a conical distributer.

9. A method for treating waste cement kiln dust according to claim 8 in which a gas flows upwardly causing solid particles of cement kiln dust to be suspended and swirl around to maximize carbonation.

10. A method for treating waste cement kiln dust according to claim 1 in which the moisture content of hydrated cement kiln dust ranges between about 7 to 12% by weight of cement kiln dust, at a temperature of the cement kiln dust at about 25° C., a flow gas concentration of 100% and a flow rate of 3 liters per minute, a gas pressure at an inlet of 1.5 bars and a residence time of between about 20 to about 60 minutes.

11. A method for treating waste cement kiln dust according to claim 1 in which the particle size of the treated cement kiln dust is decreased from about 5 to less 1 μm as indicated from a scanning electron microscope (SEM), the pH is decreased from 12.5 to about 9, the electrical conductivity is decreased from about 94.1 to about 33.3 μs, the total of dissolved solids of treated cement kiln dust is decreased from about 560 to about 201 mg/l and the loss on ignition of the treated cement kiln dust is increased from about 25.17 to about 35.57.

12. A method for treating waste cement kiln dust according to claim 1 in which the carbonation efficiency defined as the ratio between the carbon uptake from experiments to the calculated theoretical of about 91% is achieved, two forms of $CaCO_3$ morphology; rhombohedra calcite particles and uniform needle-shaped aragonite particles with mean particle sizes of one micron are defined, the sulfate concentration are decreased from about 1736 to about 112 mg/l and from about 576 to about 150 mg/l during short and long term experiments, the chloride concentration decreases from about 1286 to about 673 mg/l and from about 376 to about 338 mg/l during 6 hour and 18 hour experiments, the strontium concentration decreases from about 7.5 to 0.5 mg/l and from about 12 to about 0.3 mg/l during 6 hour and 18 hour experiments and the chromium concentrations are decreased from about 17 to about 11 mg/l and from 11 to about 5 mg/l during 6 hour and 18 hour leaching experiments respectively.

13. A method for manufacturing lime cement from treated cement kiln dust wherein the cement kiln dust is treated by the method of claim 1.

14. A method for treating cement kiln dust according to claim 1 in which soluble alkalies and sulfates are chemically fixed and/or stabilized.

15. A method for treating cement kiln dust according to claim 1 in which leached metal concentration in effluent discharges are reduced.

16. A method for treating cement kiln dust according to claim 1 wherein the treated cement kiln dust is used in a clinker making process as a raw material.

17. A method for treating cement kiln dust according to claim 1 in which the treated cement kiln dust is used for solidification/stabilization of hazardous waste.

18. A method for treating cement kiln dust according to claim 1 in which the result product is used for neutralization of acid mine drainage.

19. A method for treating cement kiln dust according to claim 1 in which the emissions of carbon dioxide are eliminated.

20. A method for treating cement kiln dust according to claim 1 in which the carbon dioxide is stored in solid form as $CaCO_3$ for future use.

* * * * *